Nov. 27, 1928. Re. 17,146

E. R. GURNEY

YIELDING CONNECTION FOR RELATIVELY MOVABLE MEMBERS

Original Filed Sept. 17, 1925

Inventor
ERVING R. GURNEY

By his Attorneys
Redding, Greeley, O'Shea & Campbell

Reissued Nov. 27, 1928. Re. 17,146

UNITED STATES PATENT OFFICE.

ERVING R. GURNEY, OF BEECHHURST, NEW YORK, ASSIGNOR TO INTERNATIONAL MOTOR COMPANY, OF NEW YORK, N. Y., A CORPORATION OF DELAWARE.

YIELDING CONNECTION FOR RELATIVELY-MOVABLE MEMBERS.

Original No. 1,660,671, dated February 28, 1928, Serial No. 56,911, filed September 17, 1925. Application for reissue filed July 20, 1928. Serial No. 294,297.

This invention relates to what may be termed a connection and support between two elements which tend to move relatively and is designed in the illustrated embodiment with reference to a connection and support for the upper part of a radiator adapted to have a steadying effect thereon. The connection is adapted to extend between the upper part of the radiator and a base of some sort from which the radiator is to be connected, supported, or steadied. One object of the invention is to provide a connection of the character described which shall be capable of adjustment whereby slight inexactness in the manufacture of the co-operating elements may be compensated for. A further object the invention involves provision of a connection of the character described with yielding non-metallic material serving as a cushioning connection and support between a movable or unstable element and the part to which it is connected. More specifically, a bracket carried with the movable element is provided with an apertured flange and a similar bracket is carried by the supporting part to which the movable element is to be connected. Through the apertures in the flanges may pass a telescoping rod which may be insulated from the respective flanges by blocks of yielding non-metallic material which, if desired, may be retained under internal static pressure whereby their strength, resiliency and wearing qualities are increased. These and other objects of the invention and the means for their attainment will be more apparent from the following detailed description of a preferred embodiment of the invention illustrated in the accompanying drawings in which:

Figure 1:
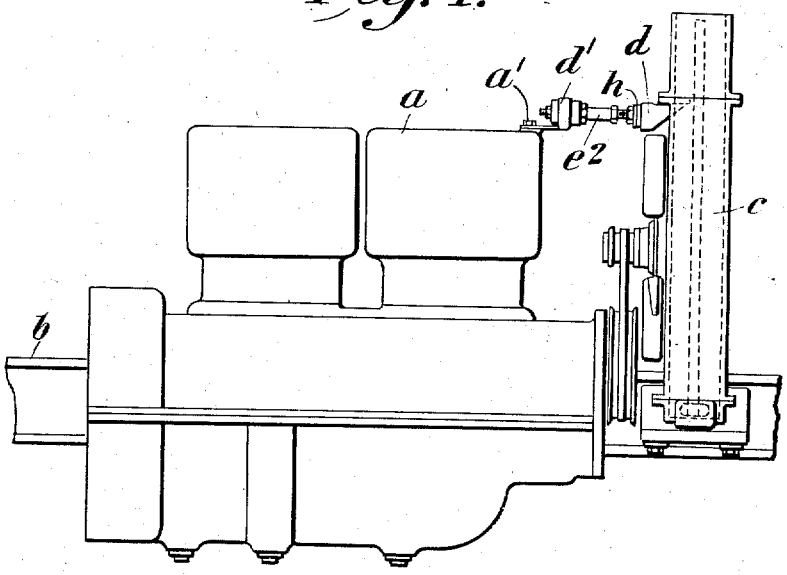
Figure 1 is a view in side elevation showing an internal combustion engine and a radiator supported respectively from the chassis frame of a vehicle and involving an adjustable brace or connection between the upper parts of the respective radiator and engine.

An internal combustion engine is indicated at $a$ and is supported in any convenient manner from a frame $b$. Also supported from the frame $b$ as by yielding connections at the lowermost part thereof is a radiator $c$. A brace or cushioning connection between the top of the engine $a$ and the upper part of the radiator $c$ is indicated as a whole at $x$ in Figure 1 and on an enlarged scale in Figure 2.

Figure 2:
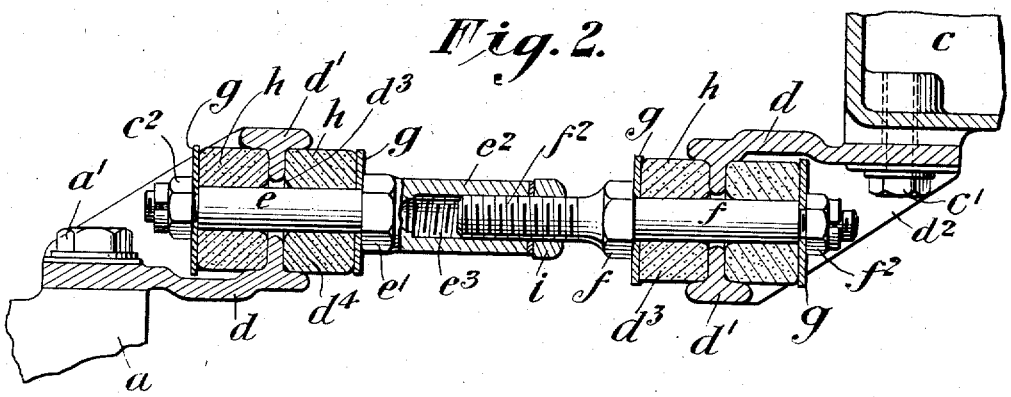
Figure 2 is an enlarged view showing the adjustable cushioning brace, partly in section.

Referring now to Figure 2 a bracket $d$ is shown as secured by a bolt $a'$ to a portion of the engine block $a$. Brackets $d$ are provided with flanges $d'$ suitably braced, if desired, from the bracket as by the webs $d^2$. In the flange $d'$ may be formed an aperture $d^3$ and passing loosely through the apertures is an adjustable rod formed of the sections $e$ and $f$, respectively. Upon either side of the flanges $d'$ there are carried on the rod discs $g$ maintained in position upon one side by shoulders $e'$, $f'$, respectively, and upon the extremities by nuts $c^2$, $f^{2\times}$, respectively. The flanges $d'$ are formed with seat portions $d^4$ upon opposite faces thereof equal to the seat members $g$ and adapted to co-operate therewith and blocks of yielding non-metallic material $h$ are adapted to be disposed between each flange and the respective discs $g$. Suitable compression may be exerted upon the blocks $h$ through the instrumentality of the nuts $c^2$, $f^{2\times}$, respectively, as will be understood, engaging the threaded ends of the sections $e$, $f$, respectively.

Adjustable devices are provided between the rod sections $e$ and $f$. In the illustrated embodiment the rod sections $e$ and $f$ are caused to telescope. Section $e$ is formed with a female portion $e^2$ interiorly threaded as at $e^3$ and section $f$ is formed with a threaded male member $f^2$. Thus in order to vary the effective length of the connection $e$, $f$, and thereby vary the distance between the radiator and supporting element $a$ the sections $e$ and $f$ may be turned relative to one another by suitably engaging the shoulders $e'$, $f'$, which are shown as wrench engaging surfaces. A lock nut $i$ is also provided in order to further secure the sections in respect to one another in predetermined position.

It will thus be seen that an adjustable connection or brace has been afforded between two relatively movable members as for example a radiator and a base which may also, if desired, include cushioning elements serving to absorb in whole or in part shocks and stresses impressed upon one of the members to prevent their transmission in whole or in part to the other element. The invention will be found particularly advantageous with respect to bracing means for the upper portion of a yieldingly supported radiator used on motor vehicles but is not to be deemed limited thereto since it is equally applicable in any situation in which two relatively movable members are connected.

Various modifications may be made in the component elements forming the brace as a whole and various forms may be taken by the adjusting device without departing from the spirit and scope of the invention.

What I claim is:

1. A connection and support between a radiator and the top of an engine comprising, in combination, a bracket carried with the radiator, a bracket carried with the engine top, seats formed on the brackets, respectively, and apertures formed in the seat portions, a telescoping element passing through the apertures in the respective brackets, blocks of yielding non-metallic material interposed operatively between the adjustable elements and the seat portions, means to retain said yielding non-metallic material under compression, and means to vary the effective length of the connecting elements.

2. A connection and support between a radiator and the top of an engine comprising, in combination, a bracket carried with the radiator, a bracket carried with the engine top, seats formed on the brackets, respectively, and apertures formed in the seat portions, an adjustable connecting element passing through the apertures in the respective brackets, blocks of yielding non-metallic material interposed operatively between the connecting element and the seat portions, and means to vary the effective length of the connecting element.

3. A connection comprising in combination a bracket carried with a relatively movable part, a bracket carried with another member to which said first named part is to be connected, seats formed on the brackets, respectively, and apertures formed in the seat portions, telescoping elements passing through the apertures in the respective brackets, blocks of yielding non-metallic material interposed operatively between the telescoping elements and the respective seat portions, means to retain said yielding non-metallic material under compression, and means to vary the effective over-all length of the telescoping elements.

4. A connection comprising in combination a bracket carried with a relatively movable member, a bracket carried with another member to which said first named member is to be connected, opposed seats formed on the brackets, respectively, and apertures formed in the seat portions, an adjustable connecting element passing through the apertures in the respective brackets, blocks of yielding non-metallic material interposed operatively between the connecting element and each one of the respective seat portions whereby forces in any direction are transmitted to each bracket through the said yielding material, and means to vary the effective length of the connecting element.

This specification signed this 30 day of June, A. D. 1928.

ERVING R. GURNEY.